United States Patent [19]

Sagae et al.

[11] Patent Number: 5,331,263
[45] Date of Patent: Jul. 19, 1994

[54] VELOCITY CONTROL DEVICE

[75] Inventors: Koji Sagae; Tomoyukui Shirai, both of Tokyo, Japan

[73] Assignee: Asahi Kogaku Kogyo Kabushiki Kaisha, Tokyo, Japan

[21] Appl. No.: 904,951

[22] Filed: Jun. 26, 1992

[30] Foreign Application Priority Data

Jun. 26, 1991 [JP] Japan .................. 3-250172

[51] Int. Cl.$^5$ ............................ G05B 11/01
[52] U.S. Cl. .................. 318/560; 318/561; 318/616; 318/366; 318/369; 388/904
[58] Field of Search ............. 388/904; 318/369, 366, 318/560, 561, 616

[56] References Cited

U.S. PATENT DOCUMENTS 4,914,725 4/1990 Belser et al. ............... 318/560
4,922,513 5/1990 Joichi ......................... 318/254

Primary Examiner—William M. Shoop, Jr.
Assistant Examiner—Karen Masih
Attorney, Agent, or Firm—Sandler, Greenblum & Bernstein

[57] ABSTRACT

A velocity control device is disclosed having feedforward signal applied to a velocity servo loop. An actuator moves a laser beam spot to a desired track of an optical disk. A displacement of the laser beam spot outputted from the actuator is differentiated by a differentiator and converted to a signal corresponding to the velocity of the movement of the laser beam spot. A signal corresponding to a distance from the present position of the laser beam spot to the desired track is obtained from the displacement and a desired count value, and is inputted to a function generator to thus obtain a square root of the distance. The difference between the square root of the distance and the moving velocity is obtained by a substracter, and a feedforward signal is added to the difference. The feedforward signal is obtained by differentiating a velocity profile with respect to time with a differentiator.

26 Claims, 6 Drawing Sheets

VELOCITY CONTROL DEVICE

BACKGROUND OF THE INVENTION

1. Field of the Invention

The present invention relates to a velocity control device by which a laser beam spot on an optical disk, for example, is moved to a desired track.

2. Description of the Related Art

When data is recorded on an optical disk, or when data recorded thereon is read, for example, a seek operation in which a laser beam spot is moved to a desired track is carried out, and to obtain an optimum performance of an optical disk device, this seek operation should be carried out at a high speed and with a high precision. Namely, in the optical disk device, the speed at which a beam spot is moved to a desired track must be high, and the beam spot must always arrive at the desired track.

Since the speed at which the laser beam spot is moved is determined by the characteristics of a drive circuit provided for operating an actuator of the optical head, the laser beam spot is moved at a finite acceleration. Therefore, when the laser beam spot is moved at a constant acceleration, to stop the laser beam spot with a high accuracy at a desired track, the laser beam spot should be moved at a velocity proportional to a square root of a distance from a present position of the laser beam spot to the desired track position. Namely, a function showing a velocity profile of the laser beam spot is $$f(\epsilon) = (2\alpha\epsilon)^{\frac{1}{2}} \quad (1)$$

wherein $\alpha$ is an acceleration, and $\epsilon$ is a distance from the present position of the laser beam spot to the desired track position.

As described above, by controlling the velocity of the laser beam spot in accordance with the equation (1), a precise seek operation is obtained. Such a control can be attained by forming a velocity servo loop including an actuator and a control circuit provided for moving the laser beam spot.

Nevertheless, since the actuator included in the velocity servo loop is a mechanical element, a gain and a bandwidth of the velocity servo loop cannot have a large value, and thus it is difficult to obtain a high responsivity. Therefore, a precise laser beam spot movement cannot be made by using the velocity servo loop alone, and thus it is difficult to attain a precise seek operation.

SUMMARY OF THE INVENTION

Therefore, an object of the present invention is to provide a velocity control device by which a controlled object such as a laser beam spot is moved precisely in accordance with the velocity profile, whereby a precise seek operation is attained.

According to the present invention, there is provided a control device comprising an obtaining mechanism for obtaining a velocity profile, a forming mechanism for forming a velocity servo loop, and an applying mechanism applying a feedforward signal to the velocity servo loop. A controlled object is moved according to the velocity profile and at a velocity proportional to a square root of a distance from a present position of the controlled object to a desired position of the controlled object. The velocity servo loop is provided for controlling the velocity of the controlled object to match the velocity profile. The feedforward signal is applied to the velocity servo loop in such a manner that the velocity of the controlled object more precisely matches the velocity profile than when controlled by the velocity servo loop alone.

Further, according to the present invention, there is provided a control device comprising an obtaining mechanism for obtaining a velocity profile, a velocity servo loop for controlling a movement of a controlled object in accordance with the velocity profile, and an applying mechanism for applying a feedforward signal to the velocity servo loop. In the velocity profile, the velocity of the controlled object is proportional to a square root of a distance from a present position, at which the controlled object is positioned to a desired position, to which the controlled object is to be moved. The feedforward signal is applied to the velocity servo loop, and accordingly, the velocity of the controlled object is kept close to the velocity profile.

Still further, according to the present invention, there is provided a control device comprising a velocity servo loop for controlling the object to be moved in accordance with a velocity profile, in which a velocity of the object is proportional to a square root of a distance from a present position of the object to a desired position of the object, and a mechanism for applying a feedforward signal to the velocity servo loop so that the velocity of the object is kept close to the velocity profile.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
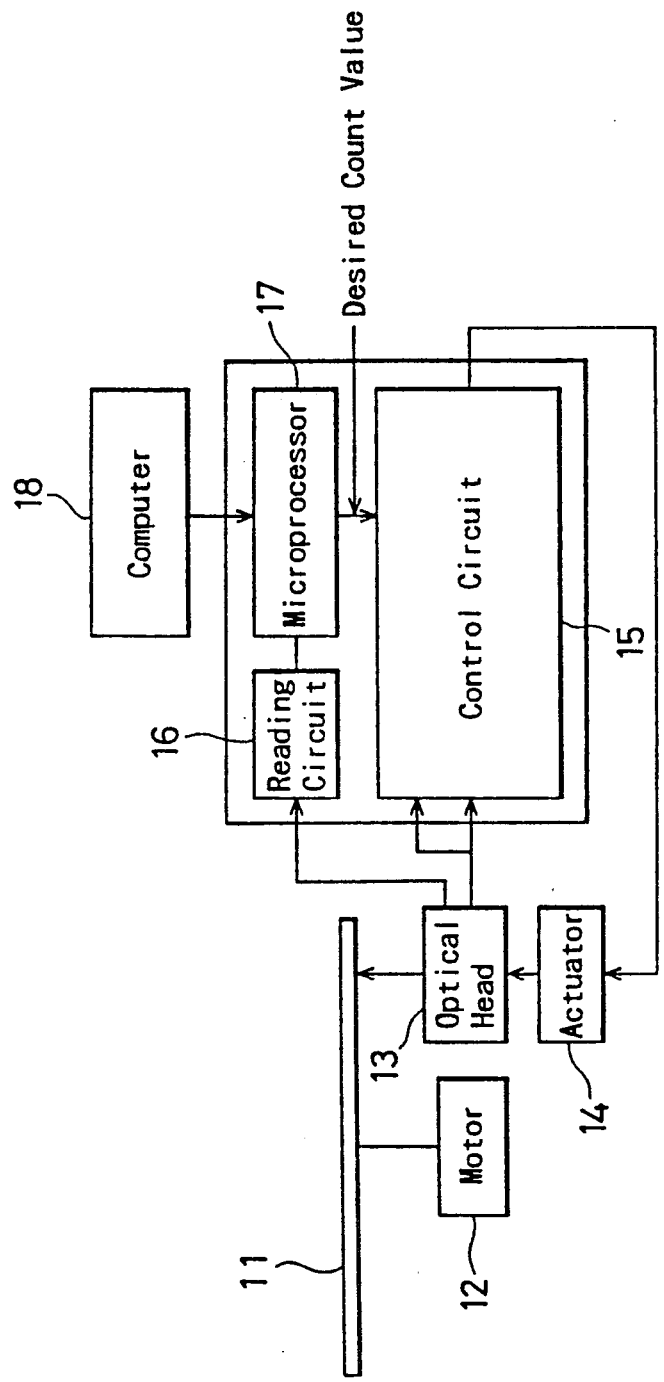
FIG. 1 is a block diagram showing a general construction of a disk device to which a first embodiment of the present invention is applied.

The present invention will now be described with reference to embodiments shown in the drawings.

FIG. 1 shows a general construction of a circuit of a disk device to which a first embodiment of the present invention is applied.

As shown in FIG. 1, an optical disk 11 is rotated by a motor 12, and during this rotation, data is written to the optical disk 11 through an optical head 13, or data recorded on the optical disk 11 is read through the optical head 13. To carry out these operations, the optical head 13 is moved radially over the optical disk 11, so that a laser beam spot is positioned at a predetermined track.

A velocity servo loop is formed by the optical head 13, an actuator 14 and a control circuit 15, for controlling a velocity of the laser beam spot such that the laser beam spot is positioned at a predetermined track in a short time and with a high accuracy.

A reading circuit 16 senses a present track position of the optical head 13. A microprocessor 17 senses, according to a file name inputted from a computer 18, a track in which the file to be accessed is recorded, i.e., a desired track to which the laser beam spot is to be moved. The microprocessor 17, in accordance with the desired track and the present track inputted from the reading circuit 16, obtains a desired count value or the number of tracks over which the laser beam spot is moved, and outputs the desired count value to the control circuit 15. The control circuit 15 controls the actuator 14 based on the desired count value and a displacement by which the actuator 14 has been displaced, so that the actuator 14 is moved in accordance with a velocity profile.

Figure 2:
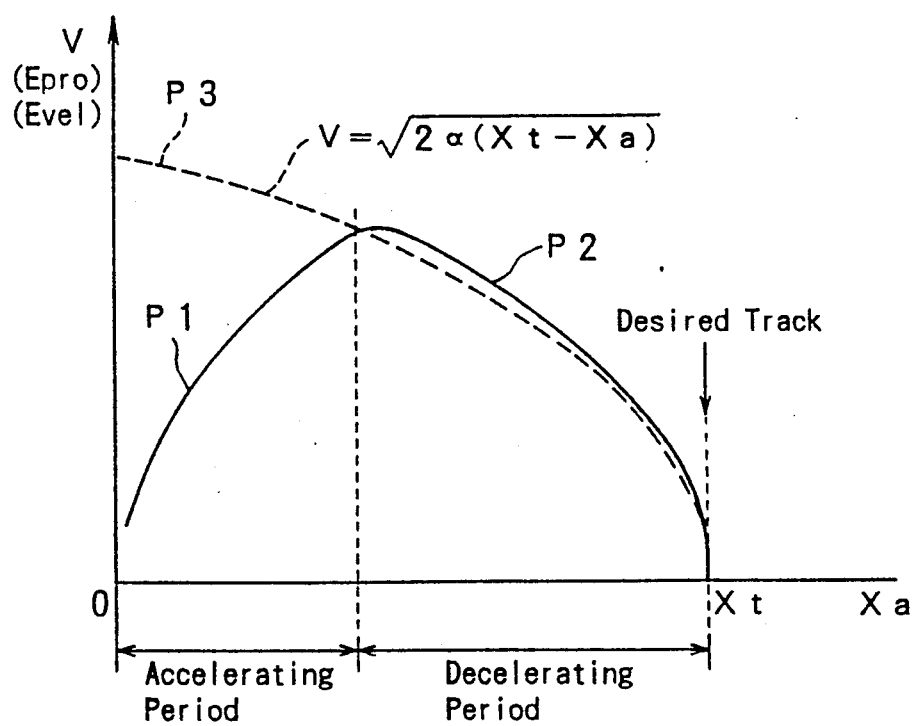
FIG. 2 is a diagram showing a relationship between a position of a laser beam spot moved in accordance with a velocity profile and a velocity of the movement of the laser beam spot.

FIG. 2 shows a relationship between a position of the laser beam spot moving in accordance with a velocity profile, and the velocity of the movement of the laser beam spot. The velocity profile P3 is shown by the following equation. Namely, $$v = (2\alpha(Xt - Xa))^{\frac{1}{2}} \qquad (2)$$

wherein v is a velocity of the movement of the laser beam spot, $\alpha$ is an acceleration (a constant value), Xt is a position of the desired track, and Xa is a present position of the laser beam spot.

As shown by the reference P1 in FIG. 2, at a first stage the laser beam spot is accelerated, and thus the velocity of the laser beam spot is made higher. This acceleration is determined in accordance with a capability of a drive circuit provided in the control circuit 15 for driving the actuator 14, and preferably the acceleration has a value obtained by the maximum capability of the drive circuit. Then, as shown by the reference P2, the laser beam spot is subjected to a negative acceleration, i.e., is decelerated. This deceleration is controlled by the control circuit 15 so that the velocity of the laser beam spot matches the velocity profile as closely as possible.

Figure 3:
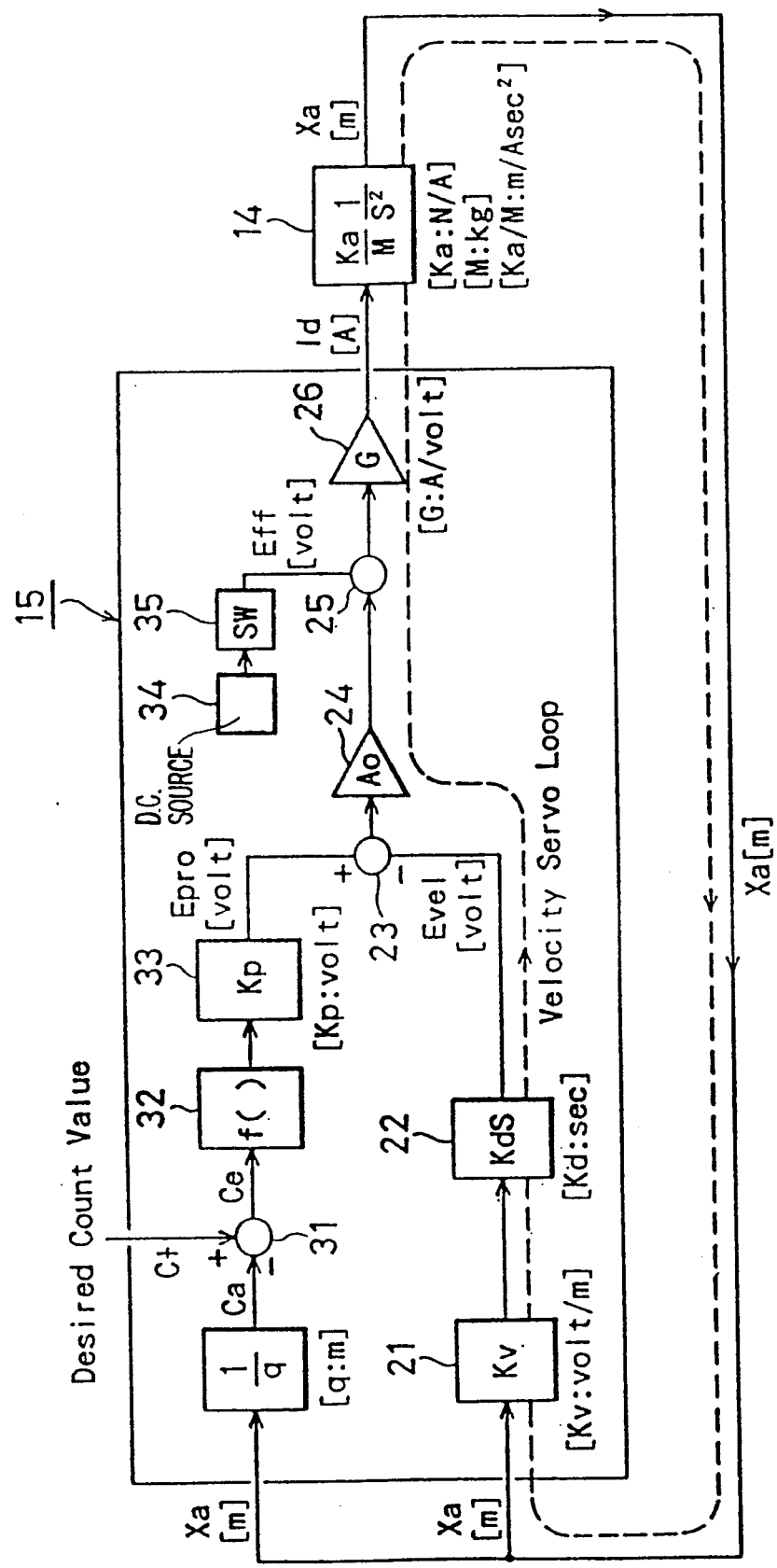
FIG. 3 is a block diagram of a control circuit.

FIG. 3 is a block diagram of the control circuit 15 including the velocity servo loop.

In this control circuit 15, the object controlled is a moving velocity of the laser beam spot, but since it is difficult to directly control this velocity, the velocity is transformed into a voltage to be controlled. Further, since it is difficult to obtain, as a value having a dimension of distance, the distance ((Xt − Xa) in the equation (2)) from the present position of the laser beam spot to the desired track, the number of pulses (the desired count value) corresponding to the number of tracks from the present position to the desired track is used.

The velocity servo loop is formed by a position sensor 21, a differentiator 22, a subtracter 23, an amplifier 24, an adder 25, a driver 26 and the actuator 14, and carries out a control such that a velocity of a movable portion of the actuator 14, i.e. the velocity of the movement of the actuator 14, matches the velocity profile.

The displacement Xa of the laser beam spot on the optical disk, i.e., the movable portion of the actuator 14, is always observed by the position sensor, 21, and is multiplied by a transforming coefficient Kv by the position sensor 21, to be thus converted to a voltage. This voltage is differentiated by time by the differentiator 22, and is multiplied by a constant Kd of the differentiator 22 to be converted to a voltage signal Evel, which is outputted from the differentiator 22 and corresponds to the velocity of the movement of the laser beam spot. Note, reference S in the drawing denotes the Laplacian.

Note, in practice, in an optical disk device, the position sensor 21 and the differentiator 22 are not provided as an actual electrical component, respectively, and the displacement Xa and the velocity of the beam spot are obtained by a known method based on a tracking error signal obtained by a tracking error signal sensing mechanism (not shown).

The voltage signal Evel is compared in the subtracter 23 with a standard voltage signal Epro described later, and the difference between these voltage signals Evel and Epro is transmitted to the amplifier 24, which amplifies the voltage signal denoting the difference. This amplified voltage signal is added in the adder 25 by a feedforward signal Eff as described later. The voltage signal to which the feedforward signal Eff is added is multiplied in the driver 26 by a transconductance G, to be converted to a drive current Id, which is supplied to the actuator 14.

The actuator 14 has a known construction by which a force is generated by an interaction of an electric current and a magnetic field. Namely, the actuator 14 generates a force Ka proportional to the drive current Id inputted from the driver 26, and the movable portion of the actuator 14 is displaced by an amount corresponding to the force generated. This amount of displacement is obtained by dividing the force Ka by the mass M of the movable portion of the actuator 14 to obtain an acceleration, and integrating this acceleration twice by time. The laser beam spot is displaced by the same amount as the movable portion of the actuator 14, and the displacement Xa is fedback to the position sensor 21.

If it is assumed that a gain of the velocity servo loop is sufficiently large, the voltage signal Evel corresponding to the velocity of the movement of the laser beam spot is controlled in such a manner that the voltage signal Evel always coincides with the standard voltage signal Epro. Namely, if the amount of the standard voltage signal Epro is proportional to a square root of a distance from the present position of the laser beam spot to the desired track to which the laser beam spot is to be moved, i.e., if the standard voltage signal Epro has a value corresponding to the velocity profile shown by the equation (2), the velocity of the movement of the laser beam spot matches the velocity profile.

To obtain a standard voltage signal Epro that matches the velocity profile, the displacement Xa of the laser beam spot, which is a distance from an initial track position at which the laser beam spot is initially positioned to a present position of the laser beam spot, is converted to a number of pulses Ca proportional to the displacement Xa. This number of pulses Ca is obtained by dividing the displacement Xa by the minimum distance resolution q, which is peculiar to the position sensing system of the laser beam spot and is a pitch of tracks of the optical disk 11 in this embodiment. The number of pulses Ca is a dimensionless number.

In a subtracter 31, the number of pulses Ca is subtracted from a desired count value Ct, i.e., the number of pulses corresponding to the number of tracks from the initial track position to a desired track. A deviation Ce obtained by this subtraction is inputted to a function generator 32, which is constructed in such a manner that a square root of data inputted thereto is calculated and outputted therefrom. The outputted value is dimensionless and multiplied by a transforming coefficient Kp in a converter 33 to become the standard voltage signal Epro.

As described above, the deviation Ce has a value proportional to a distance from the present position of the laser beam spot to the desired track, and therefore, the standard voltage signal Epro has a voltage value proportional to a square root of a distance from the present position of the laser beam spot to the desired track. Namely, the standard voltage signal Epro corresponds to the velocity profile. If the velocity servo loop operates in a stable manner and the voltage signal Evel has controlled to always coincide with the standard voltage signal Epro, the velocity of the movement of the laser beam spot should be a value proportional to a square root of a distance from the present position to the desired track.

In practice, however, since the gain and the bandwidth of the velocity servo loop are not large enough, the velocity of the movement of the laser beam spot cannot be precisely matched with the velocity servo loop only by the construction described above. This is explained below with reference to FIGS. 2 and 3.

It is assumed that the displacement Xa of the laser beam spot is zero. When starting a seek operation in which a laser beam spot is to be moved to a desired track, and when the desired count value Ct is set, this desired count value Ct is inputted to the function generator 32 as it is, and a square root of the count value Ct is outputted from the function generator 32. The standard voltage signal Epro corresponding to the square root of the count value Ct is outputted from the converter 33, and inputted to the subtracter 23. This standard voltage signal Epro is lowered according to a locus of a parabola, as shown by the reference P3, with an increase of the displacement Xa of the laser beam spot. Nevertheless, since the displacement Xa and the velocity of the laser beam spot cannot be suddenly changed, an output of the subtracter 23 shows a large value for a short time, and therefore, the actuator 14 is supplied with a large drive current Id. Accordingly, the displacement Xa and the velocity of the laser beam spot is increased whereby, as shown by the reference P1, the voltage signal Evel is increased in proportion to the velocity.

Then, when the voltage signal Evel is increased and becomes greater than the velocity profile (reference P3), the polarity of the output value of the subtracter 23 is inverted to become a negative polarity, and as a result, the flow direction of the drive current Id supplied to the actuator 14 is a reverse of that in which the drive current has flowed so far, and thus the actuator 14 is changed from an accelerating mode to a decelerating mode. Accordingly, a lowering of the velocity of the movement of the laser beam spot is started. If the gain and the bandwidth of the velocity servo loop are not sufficiently large, however, the actuator 14 cannot be changed from the accelerating mode to the decelerating mode in a short time, and thus the velocity of the movement of the laser beam spot has a slightly larger value than the velocity profile, as shown by the reference P2.

Therefore, in this embodiment, as shown in FIG. 3, a feedforward signal Eff is applied to the velocity servo loop in such a manner that the velocity of the movement of the laser beam spot more precisely matches the velocity profile than when controlled only by the velocity servo loop.

This feedforward signal Eff is generated by a direct current source 34, and applied to the velocity servo loop so that the movable portion of the actuator 14 is subjected to a constant acceleration in a direction opposite to the direction of the movement of the movable portion. Namely, a force is applied to the movable portion of the actuator 14 by which a constant acceleration in a direction opposite to that in which the laser beam spot is moved is generated for a decelerating period during which the movable portion of the actuator 14 is decelerated. Namely, the feedforward signal Eff is applied to the velocity servo loop only for the decelerating period. Accordingly, a switch 35, connected only for the decelerating period, is provided between the direct current source 34 and the adder 25. The switch 35 is turned ON when an output of the subtracter 23 has a negative value, and is turned OFF when an output of the subtracter 23 has a positive value.

An operation of the embodiment is described below with reference to FIG. 4, which shows a change of the velocity of the movement of the laser beam spot at each position, i.e., a response of the velocity of the laser beam spot to an operation by the control circuit 15.

In this drawing, the Upro and Uvel of the ordinate are shown in a dimensionless form obtained by dividing the standard voltage signal Epro and the voltage signal Evel, which is outputted from the differentiator 22, by a transforming coefficient Kp used in the converter 33. The Ca of the abscissa is the number of pulses which corresponds to the displacement Xa of the laser beam spot.

Further, in this drawing, a parameter Uc is obtained by dividing the feedforward signal Eff by AoKp, wherein Ao is a voltage gain of the amplifier 24 and Kp is the transforming coefficient of the converter 33. The parameter Uc is a value for converting the amount of the feedforward signal Eff into an output of the function generator 32. Namely, a change of the parameter Uc is equivalent to a change of the amount of the feedforward signal Eff. Also, $\omega_u$ is a unity gain frequency of the velocity servo loop, i.e., a frequency when the gain becomes 1, and $\eta$ is a ratio of a velocity sensing coefficient KvKd and a position sensing coefficient Kp/q, i.e., $$(Kp/q)/(KvKd) \quad (3)$$

wherein Kv is a transforming coefficient of the position sensing circuit 21, Kd is a constant of the differentiator 22, and q is the minimum distance resolution peculiar to the position sensing system of the laser beam spot. The position sensing coefficient Kp/q is provided for transforming a present position of the laser beam spot to a signal used for the control of this position sensing system, and the velocity sensing coefficient KvKd is provided for transforming the present position of the laser beam spot to a signal corresponding to an actual velocity of the laser beam spot. Ct is the desired count value.

Figure 4:
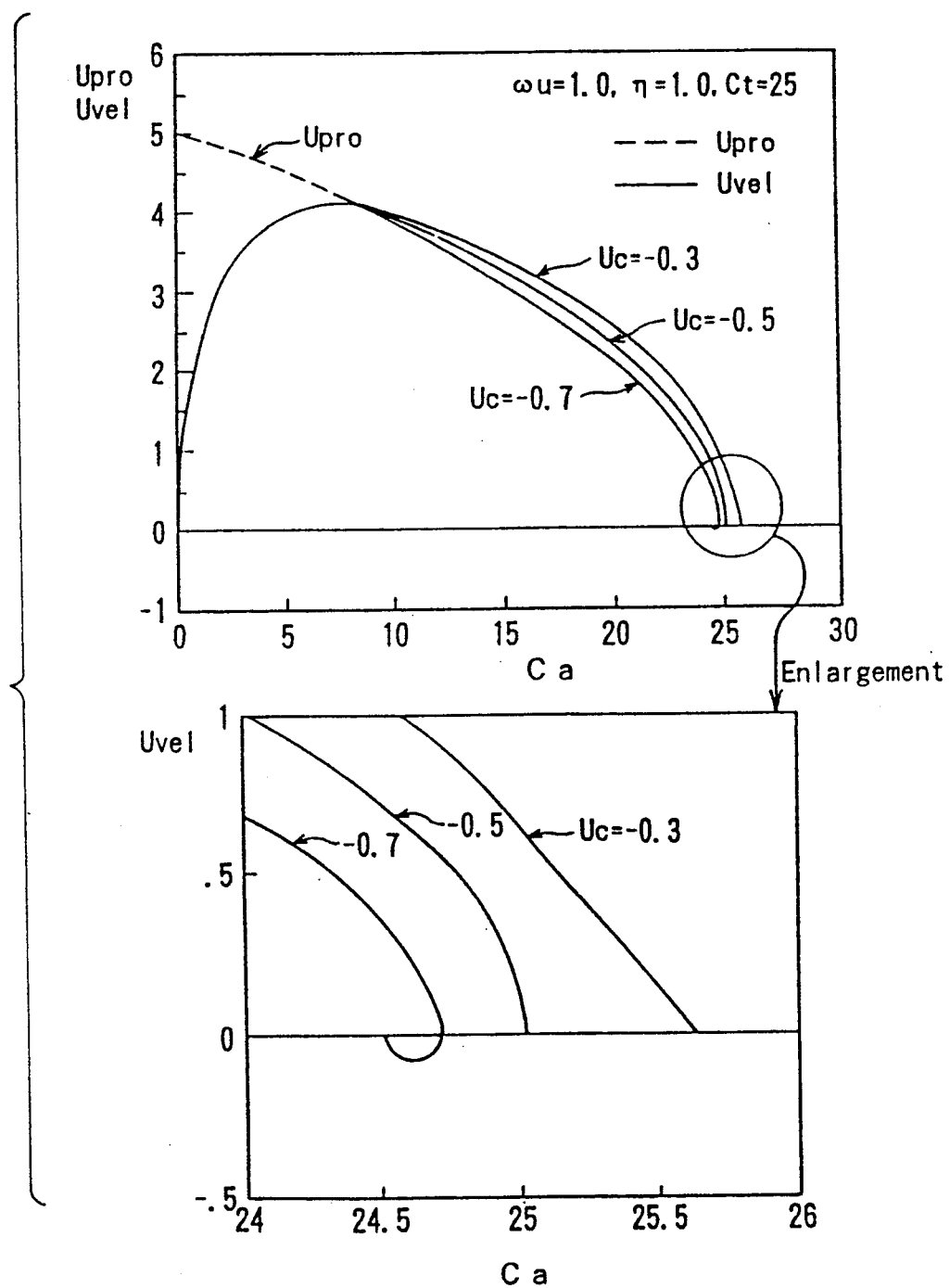
FIG. 4 is a diagram showing an operation of the control circuit shown in FIG. 3.

As understood from FIG. 4, when Uc is set to a constant value ($-0.5$), Uvel coincides with Upro, i.e., the laser beam arrives precisely at the desired track. The condition in which Uc is set to $-0.5$ is where, for example, $\omega_u = 1.0$ and $\eta = 1.0$, and generally, where the following equation (4) is satisfied.

$$Uc = -\eta/(2\omega_u) \quad (4)$$

Figure 5:
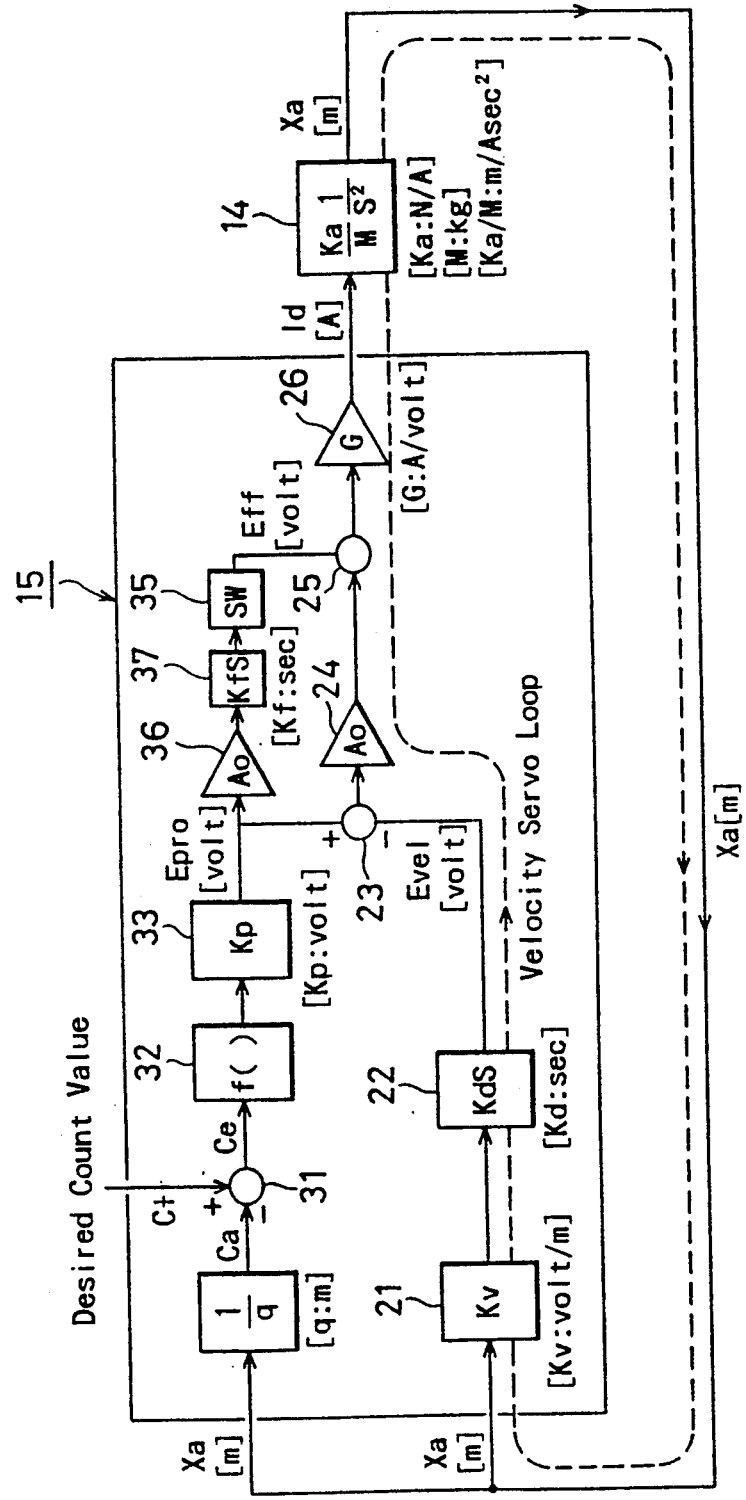
FIG. 5 is a block diagram showing a second embodiment of the present invention.

As shown in FIG. 4, if Uc is larger than $-0.5$ ($-0.3$, for example), the laser beam spot is stopped over the desired track (Ca=25), and if Uc is smaller than −0.5 (−0.7, for example), the laser beam spot is stopped before arriving at the desired track. Thus, the proper value of the value Uc of the feedforward signal depends upon the amount of $\eta$ and $\omega_u$. As a simple construction by which such a problem is solved, a second embodiment shown in FIG. 5 is effected.

In the second embodiment, a construction thereof different from the control circuit of the first embodiment shown in FIG. 3 is that an amplifier 36 and a differentiator 37 are provided between the converter 33 and the switch 35. The other parts are the same as in the first embodiment.

The standard voltage signal Epro outputted from the converter 33, i.e. the voltage signal having a value proportional to a square root of a distance from a present position of the laser beam spot to a desired track, is amplified by the amplifier 36, and this voltage signal is then differentiated by time and multiplied by a constant Kf by the differentiator 37.

When the constant Kf is set to a proper value, if an insufficient deceleration state occurs due to an effect of a disturbance (for example, a mechanical external force acting on the movable portion of the actuator, or a frictional resistance due to foreign matter adhered to the movable portion), since a velocity of the laser, beam spot becomes higher than an expected value, the time required for passing through the desired number of tracks becomes shorter than the expected time. Therefore, the standard voltage signal Epro indicating the velocity profile is varied by one step for a time shorter than an expected time, and thus an inclination (or variation) with respect to time becomes steeper (or larger). Accordingly, a time differential value of the standard voltage signal Epro becomes large, and the amount of feedforward outputted from the differentiator 37 becomes larger, and as a result, the insufficient deceleration state is alleviated. Conversely, if an excessive deceleration state occurs due to an effect of the disturbance, a time differential value of the standard voltage signal Epro becomes smaller, and the amount of the feedforward outputted from the differentiator 37 becomes smaller, and as a result, the excessive deceleration state is alleviated.

Figure 6:
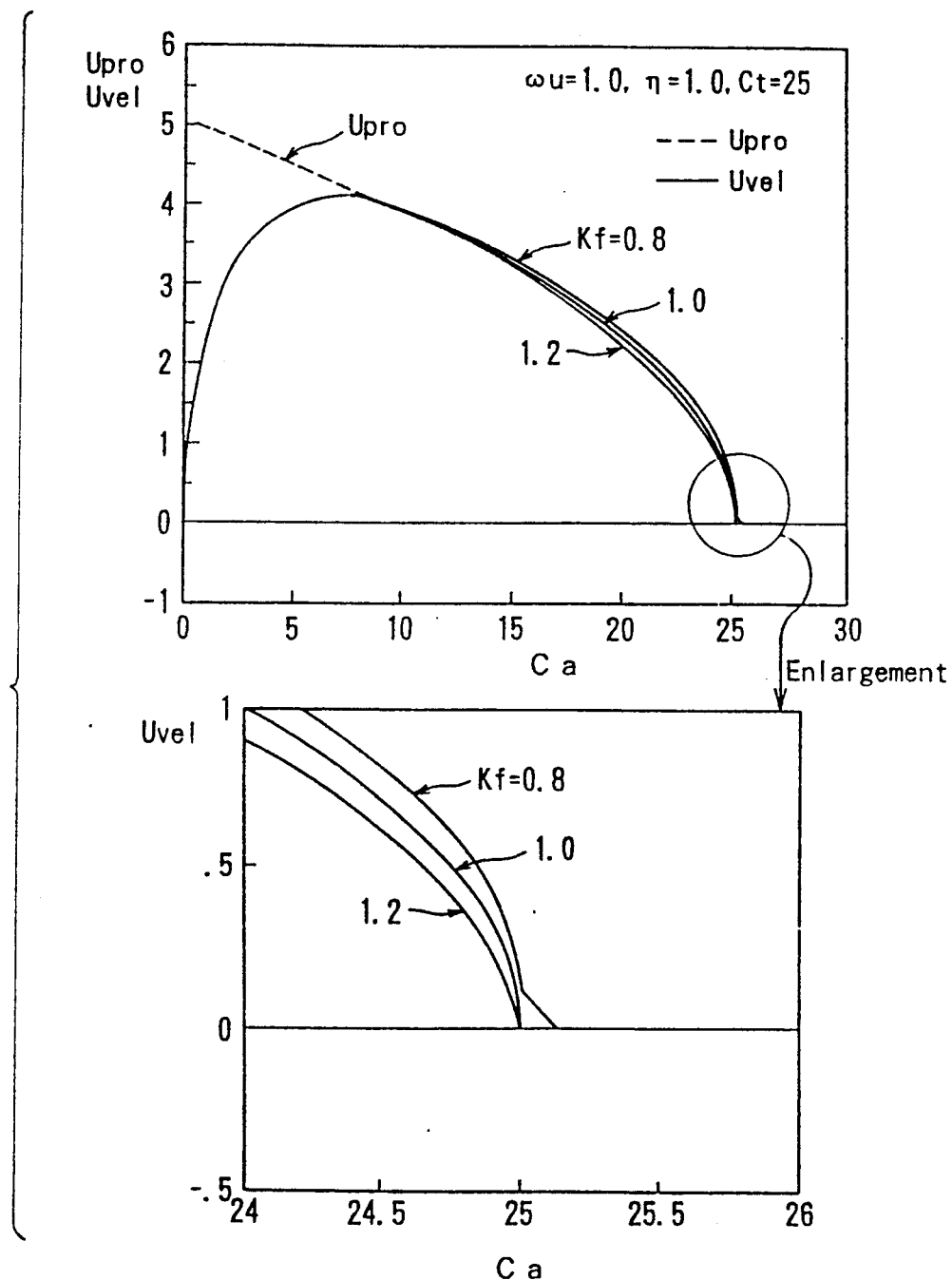
FIG. 6 is a diagram showing an operation of the control circuit shown in FIG. 5.

FIG. 6 shows a change of the velocity of the movement of the laser beam spot at each position in the second embodiment, wherein each parameter is the same as in FIG. 4.

As understood from FIG. 6, when $\omega_u$=1.0, Kf has a proper value when Kf≈1.0; generally, Kf has a proper value when the following equation (5) is satisfied.

$$Kf = 1/\omega_u \tag{5}$$

As understood from a comparison between the equations (4) and (5), the equation (5) does not include $\eta$. Accordingly, when using the feedforward signal as in this embodiment, a control of the velocity of the laser beam spot is not affected by $\eta$. Further, according to this embodiment, even when Kf becomes larger than the proper value, and thus an excessive decelerating state occurs, a state in which the laser beam spot does not arrive at the desired track does not occur. As described above, when the time differential value of the velocity profile is used as a feedforward signal, the accuracy of a positional control of the laser beam spot is improved in comparison with a state in which the feedforward signal is a constant value.

Note, although the present invention is applied to the position control in the optical disk in each of the above embodiments, the present invention is not restricted to such a control but can be applied to a device controlled in such a manner that another controlled object arrives at a desired position.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 3-250172 (filed on Jun. 26, 1991) which is expressly incorporated herein by reference in its entirety.

We claim:

1. A velocity control device for controlling a velocity of a controlled object, said control device comprising:

means for obtaining a velocity profile in which the velocity of the controlled object is proportional to a square root of a distance from a present position of the controlled object to a desired position of the controlled object;

means for forming a velocity servo loop for controlling the velocity of the controlled object so that the velocity of the controlled object substantially matches said velocity profile; and means for applying a feedforward signal to said velocity servo loop so that the velocity of the controlled object is more precisely matched with said velocity profile than when controlled by said velocity servo loop alone, said feedforward signal being applied to said velocity servo loop so that the controlled object is subjected to a constant acceleration in a direction opposite to a direction of movement of the controlled object, said feedforward signal being applied to said velocity servo loop only while the controlled object is decelerating.

2. A velocity control device for controlling a velocity of a controlled object, said control device comprising:

means for obtaining a velocity profile in which the velocity of the controlled object is proportional to a square root of a distance from a present position of the controlled object to a desired position of the controlled object;

means for obtaining a feedforward signal in accordance with $-\eta/(2\,\omega_u)$ wherein $\eta$ is a ratio of a position sensing coefficient and a velocity sensing coefficient, and $\omega_u$ is a unity gain frequency of said velocity servo loop, said position sensing coefficient being provided for transforming a present position of the controlled object to a signal used for the control of the velocity control device, said velocity sensing coefficient being provided for transforming the present position of the controlled object to a signal corresponding to an actual velocity of the controlled object;

means for forming a velocity servo loop for controlling the velocity of the controlled object so that the velocity of the controlled object substantially matches said velocity profile; and means for applying a feedforward signal to said velocity servo loop so that the velocity of the controlled object is more precisely matched with said velocity profile than when controlled by said velocity servo loop alone, said feedforward signal having a constant value.

3. A velocity control device according to claim 1, wherein said feedforward signal has a value corresponding to a differential value obtained by differentiating said velocity profile by time.

4. A velocity control device for controlling a velocity of a controlled object, said control device comprising:
means for obtaining a velocity profile in which the velocity of the controlled object is proportional to a square root of a distance from a present position of the controlled object to a desired position of the controlled object;
means for forming a velocity servo loop for controlling the velocity of the controlled object so that the velocity of the controlled object substantially matches said velocity profile; and
means for applying a feedforward signal to said velocity servo loop so that the velocity of the controlled object is more precisely matched with said velocity profile than when controlled by said velocity servo loop alone, said feedforward signal having a value corresponding to a differential value obtained by differentiating said velocity profile by time and said feedforward signal being obtained by multiplying said differential value by $Kf=1/\omega_u$, wherein $\omega_u$ is a unity gain frequency of said velocity servo loop.

5. A device for controlling a velocity of a controlled object, comprising:
means for obtaining a velocity profile in which the velocity of the controlled object is proportional to a square root of a distance from a present position at which the controlled object is positioned to a desired position to which the controlled object is to be moved;
a velocity servo loop for controlling the controlled object to be moved in accordance with said velocity profile; and
means for applying a feedforward signal to said velocity servo loop so that the velocity of the controlled object substantially coincides with said velocity profile, said feedforward signal being supplied to said velocity servo loop so that the controlled object is subjected to a constant acceleration in a direction opposite to a direction of movement of the controlled object, said feedforward signal being applied to said velocity servo loop only while the controlled object is decelerating.

6. A device for controlling a movement of an object, comprising:
a velocity servo loop for controlling the object to be moved in accordance with a velocity profile in which a velocity of the object is proportional to a square root of a distance from a present position of the object to a desired position of the object; and
means for applying a feedforward signal to said velocity servo loop so that the velocity of the object substantially matches said velocity profile, said feedforward signal being applied to said velocity servo loop so that the object is subjected to a constant acceleration in a direction opposite to a direction of movement of the object, said feedforward signal being applied to said velocity servo loop only while the controlled object is decelerating.

7. A device according to claim 5, wherein said feedforward signal corresponds to a time differential value of said velocity profile.

8. A device for controlling a velocity of a controlled object, comprising:
means for obtaining a velocity profile in which the velocity of the controlled object is proportional to a square root of a distance from a present position at which the controlled object is positioned to a desired position to which the controlled object is to be moved;
a velocity servo loop for controlling the controlled object to be moved in accordance with said velocity profile; and
means for applying a feedforward signal to said velocity servo loop so that the velocity of the controlled object substantially coincides with said velocity profile, said feedforward signal being generated by a direct current source and applied to said velocity servo loop only when the controlled object is decelerating.

9. A device according to claim 6, wherein said feedforward signal corresponds to a time differential value of said velocity profile.

10. A device for controlling a movement of an object, comprising:
a velocity servo loop for controlling the object to be moved in accordance with a velocity profile in which a velocity of the object is proportional to a square root of a distance from a present position of the object to a desired position of the object; and
means for applying a feedforward signal to said velocity servo loop so that the velocity of the object substantially matches said velocity profile, said feedforward signal being generated by a direct current source and applied to said velocity servo loop only when the controlled object is decelerating.

11. A velocity control device according to claim 1, wherein the controlled object is a laser beam spot.

12. A velocity control device according to claim 1, further comprising an optical disk that is rotated by a motor and an optical head for recording and reproducing data on the optical disk, the optical head being movable radially over the optical disk to position the controlled object at a predetermined track of the optical disk.

13. The velocity control device according to claim 2, wherein the controlled object is a laser beam spot.

14. A velocity control device according to claim 2, further comprising an optical disk that is rotated by a motor and an optical head for recording and reproducing data on the optical disk, the optical head being movable radially over the optical disk to position the controlled object at a predetermined track of the optical disk.

15. A velocity control device according to claim 4, wherein the controlled object is a laser beam spot.

16. A velocity control device according to claim 4, further comprising an optical disk that is rotated by a motor and an optical head for recording and reproducing data on the optical disk, the optical head being movable radially over the optical disk to position the controlled object at a predetermined track of the optical disk.

17. A device according to claim 5, wherein the controlled object is a laser beam spot.

18. A device according to claim 5, further comprising an optical disk that is rotated by a motor and an optical head for recording and reproducing data on the optical disk, the optical head being movable radially over the optical disk to position the controlled object at a predetermined track of the optical disk.

19. A velocity control device according to claim 6, wherein the controlled object is a laser beam spot.

20. A device according to claim 6, further comprising an optical disk that is rotated by a motor and an optical head for recording and reproducing data on the optical disk, the optical head being movable radially over the optical disk to position the controlled object at a predetermined track of the optical disk.

21. A velocity control device according to claim 8, wherein the controlled object is a laser beam spot.

22. A velocity control device according to claim 8, further comprising an optical disk that is rotated by a motor and an optical head for recording and reproducing data on the optical disk, the optical head being movable radially over the optical disk to position the controlled object at a predetermined track of the optical disk.

23. A velocity control device according to claim 10, wherein the controlled object is a laser beam spot.

24. A velocity control device according to claim 10, further comprising an optical disk that is rotated by a motor and an optical head for recording and reproducing data on the optical disk, the optical head being movable radially over the optical disk to position the controlled object at a predetermined track of the optical disk.

25. A velocity control device according to claim 8, wherein said feedforward signal corresponds to a time differential value of said velocity profile.

26. A velocity control device according to claim 10, wherein said feedforward signal corresponds to a time differential value of said velocity profile.

* * * * *

UNITED STATES PATENT AND TRADEMARK OFFICE
CERTIFICATE OF CORRECTION

PATENT NO. : 5,331,263
DATED : July 19, 1994
INVENTOR(S) : Koji Sagae et al

It is certified that error appears in the above-indentified patent and that said Letters Patent is hereby corrected as shown below:

On the cover sheet, Item [75], line 1 under Inventors, change "Tomoyukui" to ---Tomoyuki---.
At column 11, line 1 (claim 19, line 1), delete "velocity control".

Signed and Sealed this

Fourteenth Day of March, 1995

Attest:

BRUCE LEHMAN

Attesting Officer     Commissioner of Patents and Trademarks